US012322361B2

(12) United States Patent
Chang

(10) Patent No.: US 12,322,361 B2
(45) Date of Patent: Jun. 3, 2025

(54) SHOULDER REST FOR VIOLIN

(71) Applicant: Hyunhye Chang, Gunpo-si (KR)

(72) Inventor: Hyunhye Chang, Gunpo-si (KR)

( * ) Notice: Subject to any disclaimer, the term of this patent is extended or adjusted under 35 U.S.C. 154(b) by 261 days.

(21) Appl. No.: 18/333,961

(22) Filed: Jun. 13, 2023

(65) Prior Publication Data

US 2024/0386870 A1 Nov. 21, 2024

(30) Foreign Application Priority Data

May 15, 2023 (KR) ........................ 10-2023-0062536

(51) Int. Cl.
*G10D 3/18* (2020.01)
*G10D 1/02* (2006.01)

(52) U.S. Cl.
CPC ................. *G10D 3/18* (2013.01); *G10D 1/02* (2013.01)

(58) Field of Classification Search
CPC ................................... G10D 3/18; G10D 1/02
See application file for complete search history.

(56) References Cited

U.S. PATENT DOCUMENTS 252,923 A * 1/1882 Becker ..................... G10D 3/18 84/278
397,454 A * 2/1889 Bohmann ................ G10D 3/18 84/278
544,003 A * 8/1895 Peabody .................. G10D 3/18 84/278
755,977 A * 3/1904 White ...................... G10D 3/18 84/278
775,792 A * 11/1904 Becker ..................... G10D 3/18 84/278
821,803 A * 5/1906 Hughes .................... G10D 3/18 84/278
908,541 A * 1/1909 Becker ..................... G10D 3/18 84/278
932,844 A * 8/1909 Beisheim ................. G10D 3/18 84/280
1,087,066 A * 2/1914 Locke ...................... G10D 3/18 84/280

(Continued)

FOREIGN PATENT DOCUMENTS

CH 686205 A5 * 1/1996 ............... G10D 3/18
DE 9303031 U1 * 6/1993

(Continued)

*Primary Examiner* — Robert W Horn
(74) *Attorney, Agent, or Firm* — KORUS Patent, LLC; Seong Il Jeong

(57) ABSTRACT

Disclosed herein is a shoulder rest for a violin. The shoulder rest for a violin includes: a chin rest member installed in the form of being placed on the top plate of a violin, and provided with a pair of first coupling screw rods formed on one side thereof; turnbuckles screwed into the first coupling screw rods; an installation rail configured such that a pair of second coupling screw rods are coupled to the remaining sides of the turnbuckles, respectively, and the installation rail is formed to connect the inner ends of the second coupling screw rods while forming a single path; a clamp installed at a position, desired by a player, along the path of the installation rail; and a composite support member coupled to the clamp, and configured to support the shoulder and chest of the player.

9 Claims, 12 Drawing Sheets

(56) References Cited

U.S. PATENT DOCUMENTS

| | | | | | |
|---|---|---|---|---|---|
| 1,094,984 | A * | 4/1914 | Edlavitch | G10D 3/18 84/278 |
| 1,163,636 | A * | 12/1915 | Becker | G10D 3/18 84/278 |
| 1,238,426 | A * | 8/1917 | Morgester | G10D 3/18 84/278 |
| 1,296,831 | A * | 3/1919 | Meier | G10D 3/18 84/278 |
| 1,416,644 | A * | 5/1922 | Jordan | G10D 3/18 84/278 |
| 1,431,007 | A * | 10/1922 | Kenne | G10D 3/18 84/278 |
| 1,721,919 | A * | 7/1929 | Meyers | G10D 3/18 984/124 |
| 1,760,593 | A * | 5/1930 | Gosparlin | G10D 3/18 84/278 |
| 1,971,552 | A * | 8/1934 | Fisher | G10D 3/18 84/278 |
| 2,004,356 | A * | 6/1935 | Westman | G10D 3/18 984/124 |
| 2,652,739 | A * | 9/1953 | Hall | G10D 3/18 984/124 |
| 3,727,509 | A * | 4/1973 | Henkle | G10D 3/18 84/278 |
| 4,212,222 | A * | 7/1980 | Henkle | G10D 3/18 84/278 |
| 4,248,125 | A * | 2/1981 | Everett | G10D 3/18 84/278 |
| 7,368,645 | B2 * | 5/2008 | Armstrong | G10D 3/18 84/278 |
| 9,305,528 | B1 * | 4/2016 | Chen | G10D 3/18 |
| 9,495,942 | B2 * | 11/2016 | Vochezer | G10D 3/18 |
| 10,283,095 | B1 * | 5/2019 | Mobley | G10D 3/18 |
| 2024/0386870 | A1 * | 11/2024 | Chang | G10D 3/18 |

FOREIGN PATENT DOCUMENTS

| | | | | |
|---|---|---|---|---|
| DE | 202010003336 | U1 * | 8/2010 | G10D 3/18 |
| EP | 180069 | A * | 5/1986 | G10D 3/18 |
| EP | 0445632 | A1 * | 9/1991 | |
| EP | 3547304 | A1 * | 10/2019 | G10D 3/18 |
| JP | 2015-505065 | A | 2/2015 | |
| KR | 10-2020-0043058 | A | 4/2020 | |
| KR | 102182446 | B1 * | 11/2020 | |
| WO | WO-8002617 | A1 * | 11/1980 | |
| WO | WO-2006117564 | A1 * | 11/2006 | G10D 3/18 |

* cited by examiner

SHOULDER REST FOR VIOLIN

CROSS-REFERENCE TO RELATED APPLICATION

This application claims the benefit of Korean Patent Application No. 10-2023-0062536 filed on May 15, 2023, which is hereby incorporated by reference herein in its entirety.

BACKGROUND

1. Technical Field

The present invention relates to a shoulder rest that is applied to string instruments such as violins and violas. More particularly, the present invention relates to technology capable of stably supporting the shoulder and chin of a player with only a single rest without requiring any additional fixation mechanism and also capable of allowing a support position to be adjusted according to the physical condition of a player.

2. Description of the Related Art

In general, a violin is an instrument that is played in the state of being placed between the chin and shoulder of a player, and a musical instrument similar to a violin is a viola.

Accordingly, in order to play a violin, a chin rest and a shoulder rest need to be installed on the violin. In the case of a chin rest, the chin rest is coupled to a violin by tightening and holding the upper and lower parts of the violin through the coupling force of a screw formed on the chin rest. In contrast, in the case of a shoulder rest, the shoulder rest is fixed to a rim, formed on the back of a violin, by using a fixation part.

However, in this support configuration, the chin rest and the shoulder rest are independently fixed to a violin, so that there is a problem in that the installation and separation of the rests are inconvenient and difficult. Due to the basic installation height of the fixation part for fixing the rest to a violin, a player having a short neck suffers from a posture problem such as the problem of having to lift his or her chin higher, so that there occurs a problem in that the posture problem may cause pain in his or her chin and neck.

In addition, the shoulder rest is fixed to the rim of a violin through an additional fixation part, so that it affects the overall resonance of the violin while the violin is being played, with the result that there arises a problem in that the original sound of the violin cannot be produced and thus the sound quality is deteriorated.

In order to overcome these problems, the present inventor, as disclosed in Patent No. 10-2182446 (entitled "Shoulder Rest for Violin"), discloses a technology including: a base plate detachably fixed to a known clamp for fixing a chin rest placed on the top plate of a violin; a shoulder rest screwed into a female screw portion formed on one side of the base plate, and configured to enable fine adjustment by rotating a shoulder rest member at a preferred angle suitable for the body shape of a player; and a chest support part coupled to a male screw portion formed on the other side of the base plate by a tightening member and configured to enable fine adjustment by rotating a chest support member at a preferred angle suitable for the body shape of the player.

SUMMARY

The present invention has been conceived to overcome the above-described and an object of the present invention is to fix a shoulder rest to a violin in integration with a chin rest while allowing the shoulder rest to be applied to existing turnbuckles without requiring any additional device, thereby minimizing a contact area with the violin and thus fundamentally reducing the factors that deteriorate sound quality.

Furthermore, another object of the present invention is to provide a shoulder rest for a violin in which parts are constructed in the form of joints using balls, so that the heights and angles of the shoulder pad plate, chest pad plate, and composite pad plate of the shoulder rest can be finely adjusted to fit the special physical condition and/or body shape of a player.

In addition, in order to supplement the technology of Korean Patent No. 10-2182446 (entitled "Shoulder Rest for Violin") registered by the same inventor, the inventor has contrived the present invention through years of trial and error and in-depth research and design, and an object of the present invention is to change the existing patent technology into a completely different structure, thereby improving marketability, the convenience of use, and durability.

According to an aspect of the present invention, there is provided a shoulder rest for a violin, the shoulder rest including: a chin rest member installed in the form of being placed on the top plate of a violin, and provided with a pair of first coupling screw rods formed on one side thereof; turnbuckles screwed into the first coupling screw rods; an installation rail configured such that a pair of second coupling screw rods are coupled to the remaining sides of the turnbuckles, respectively, and the installation rail is formed to connect the inner ends of the second coupling screw rods while forming a single path; a clamp installed at a position, desired by a player, along the path of the installation rail; and a composite support member coupled to the clamp, and configured to support the shoulder and chest of the player.

The installation rail may form a circular path and have a rectangular cross-sectional structure.

The clamp may include: a body; a rail groove formed on one side of the body, and configured to allow the body to move along the installation rail; a position fixing screw coupled to one side of the rail groove, and configured to fix the body to the installation rail; and a ball connection part coupled to one side of the body, configured to enable an angular change in a desired direction, and coupled to the composite supporting member.

The composite support member may include: a composite pad plate formed in a plate shape; a shoulder pad and a chest pad attached to both ends of the composite pad plate, respectively; position adjustment holes formed at regular intervals through the portion of the composite pad plate between the shoulder pad and the chest pad; and an adjustment screw coupled to the clamp at a position desired and selected from among the position adjustment holes by the player.

According to another aspect of the present invention, there is provided a shoulder rest for a violin, the shoulder rest including: a chin rest member installed in the form of being placed on the top plate of a violin, and provided with a pair of first coupling screw rods formed on one side thereof; turnbuckles screwed into the first coupling screw rods; an installation rail configured such that a pair of second coupling screw rods are coupled to the remaining sides of the turnbuckles, respectively, and the installation rail is formed to connect the inner ends of the second coupling screw rods while forming a single path; a first clamp installed at a position, desired by a player, along the path of the installation rail; a second clamp additionally installed onto the installation rail, and configured to be adjusted and fixed to a position, desired by the player, together with the first clamp; a shoulder support member coupled to the first clamp, and configured to support the shoulder of the player; and a chest support member coupled to the second clamp, and configured to support the chest of the player.

The first clamp may include: a body; a rail groove formed on one side of the body, and configured to allow the body to move along the installation rail; a position fixing screw coupled to one side of the rail groove, and configured to fix the body to the installation rail; and a ball connection part ball-coupled to one side of the body, configured to enable an angular change in a desired direction, and coupled to the shoulder support member.

The second clamp may include: a movable ball formed in a ball shape, and provided with a movable groove formed to be movable along the installation rail; a ball housing ball-coupled with the movable ball, and configured to make a change to a desired angle; a ball position fixing screw coupled to the movable ball, and configured to fix the movable ball and the ball housing to the installation rail; and a connection rod formed to protrude from one side of the ball housing; and a ball-shaped portion integrated with an end of the connection rod, and coupled to the chest support member.

The shoulder support member may include: a shoulder pad plate formed in a plate shape; a shoulder pad attached to one side of the shoulder pad plate; a plurality of position adjustment holes formed through the shoulder pad plate at regular intervals; and an adjustment screw coupled to the first clamp at a position desired and selected from among the position adjustment holes by the player.

The chest support member may include: a chest pad plate formed in a plate shape; a chest pad attached to the overall surface of one side of the chest pad plate; and a ball coupling portion formed on the side of the chest pad plate opposite to the chest pad, ball-coupled with the ball-shaped portion, and configured to adjust the chest pad in a desired direction.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Embodiments of the present invention will be described in detail below with reference to the accompanying drawings. Furthermore, in the following description of the present invention, when it is determined that a detailed description of a related known function or configuration may unnecessarily obscure the gist of the present invention, the detailed description will be omitted.

Figure 1:
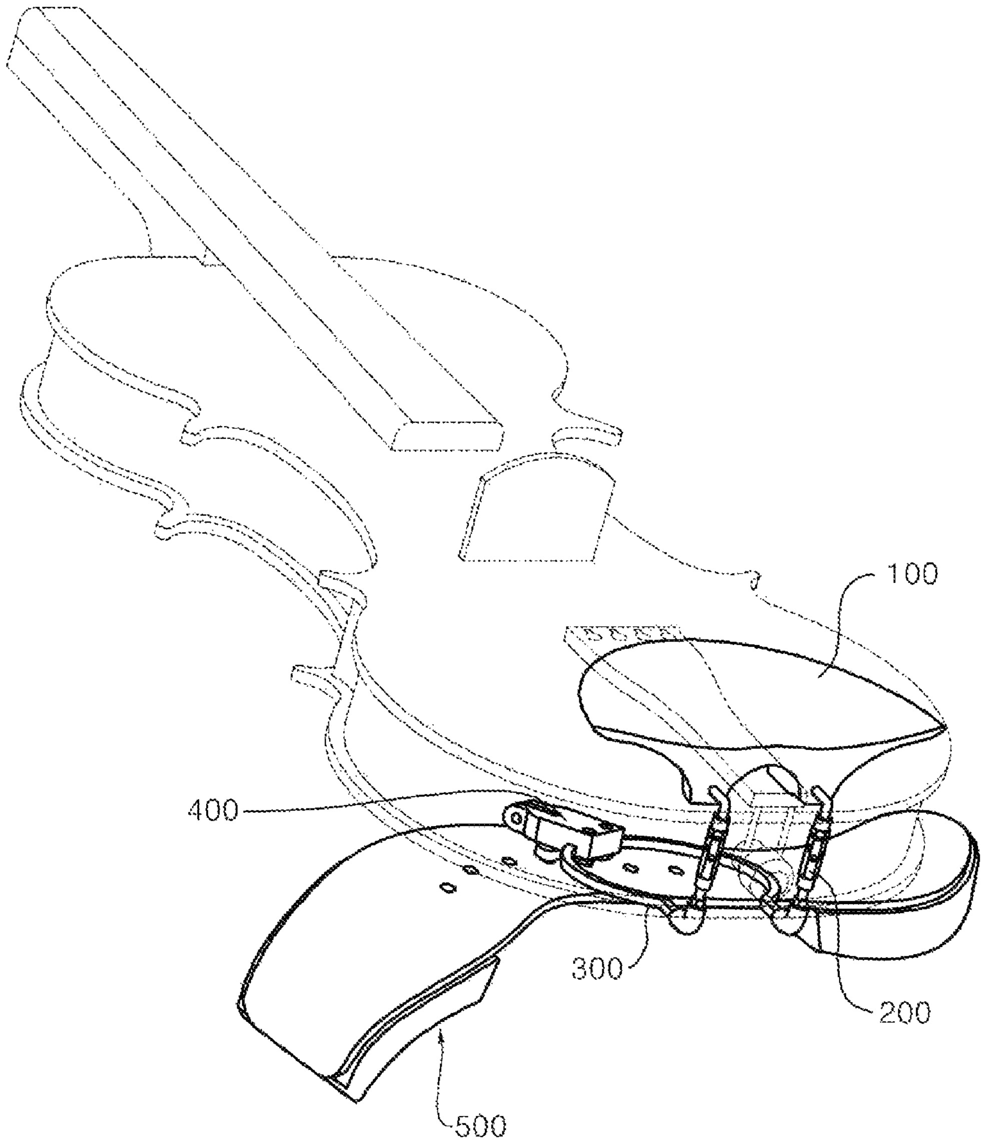
FIG. 1 is a perspective view of a state in which a shoulder rest for a violin according to the present invention is mounted on a violin.
Figure 2:
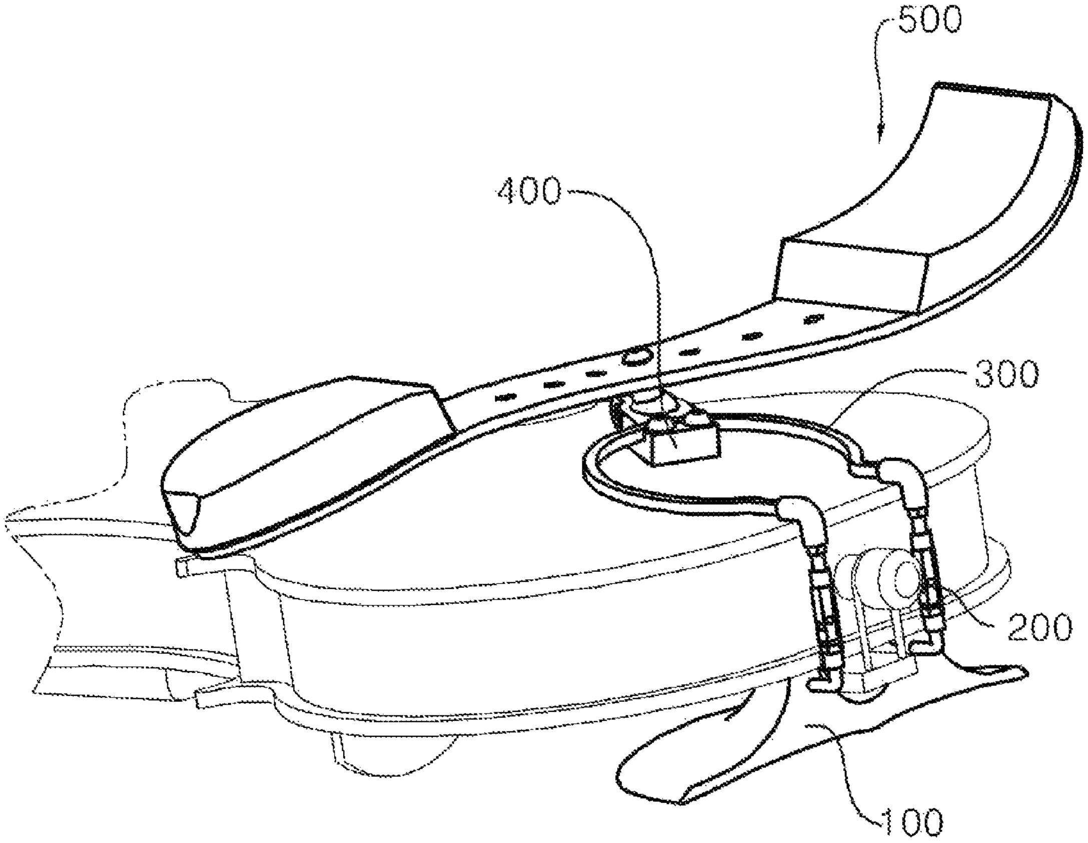
FIG. 2 is a perspective view showing the main components of a shoulder rest for a violin according to a first embodiment of the present invention.

The present invention is directed to technology that is coupled to a violin, as shown in FIGS. 1 and 2, and can not only support a violinist's chin, shoulder, and chest through a known turnbuckle (200) coupling method without a separate fixation part, but also freely adjust the support position of the shoulder and the chest to suit the player's body.

Figure 3:
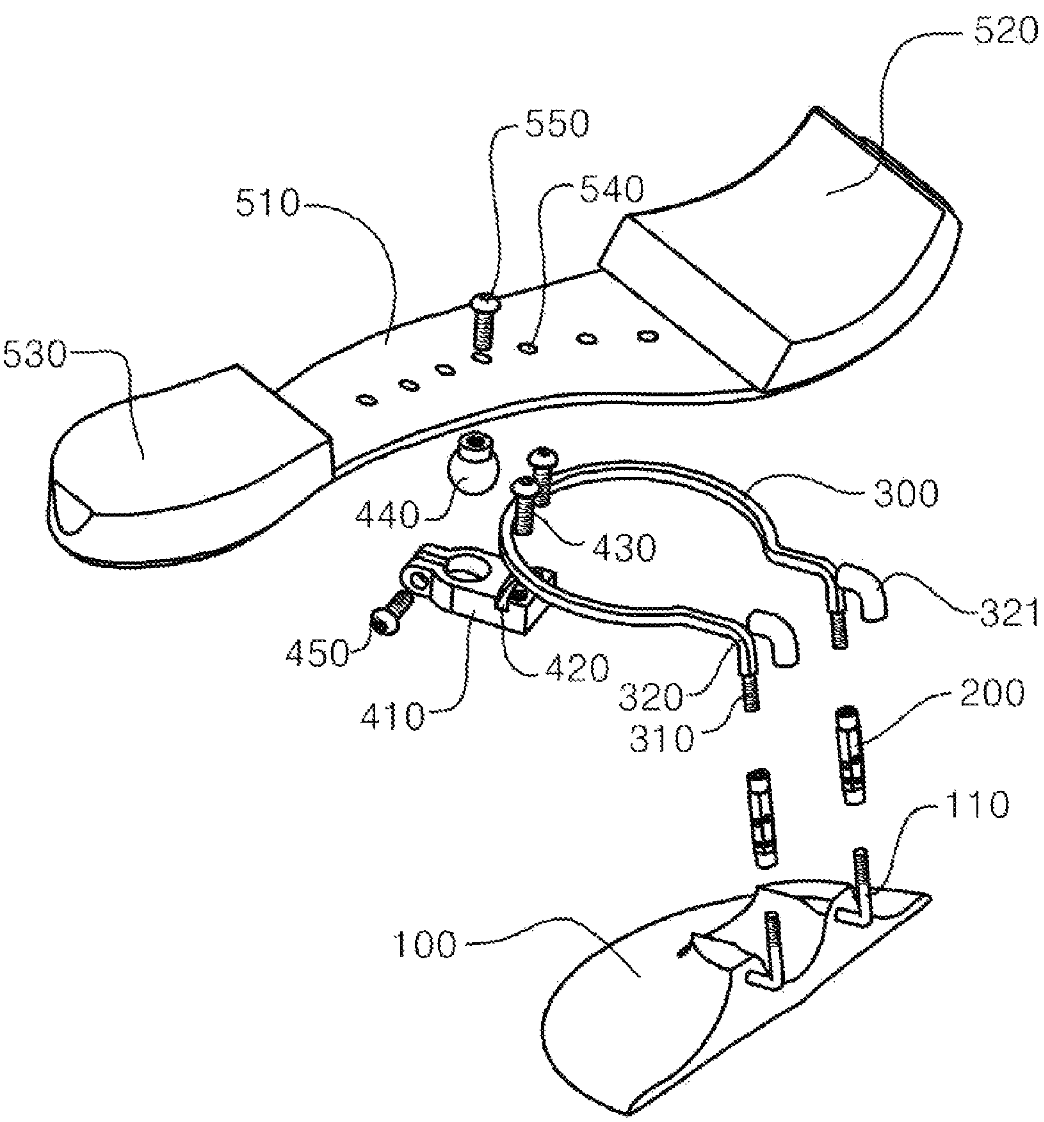
FIG. 3 is an exploded perspective view showing the main components of the first embodiment of the present invention.

FIG. 3 shows a first embodiment of a shoulder rest for a violin according to the present invention. The shoulder rest for a violin includes: a chin rest member 100 installed in the form of being placed on the top plate of a violin, and provided with a pair of first coupling screw rods 110 formed on one side thereof; turnbuckles 200 screwed into the first coupling screw rods 110; an installation rail 300 configured such that a pair of second coupling screw rods 310 are coupled to the remaining sides of the turnbuckles 200, respectively, and the installation rail 300 is formed to connect inner ends of the second coupling screw rods 310 while forming a single path; a clamp 400 installed at a position, desired by a player, along the path of the installation rail 300; and a composite support member 500 coupled to the clamp 400, and configured to support the shoulder and chest of the player.

As shown in the drawing, the chin support member 100 has a structure in which the pair of first coupling screw rods 110 are formed. Since it has a known structure, a detailed description thereof will be omitted.

The turnbuckles 200 are provided as a pair of turnbuckles, and are configured to connect the installation rail 300 and the chin support member 100 in order to couple them to each other. That is, the first coupling screw rods 110 are coupled to first sides of the turnbuckles 200, the second coupling screw rods 310 are coupled to the remaining sides of the turnbuckles 200, and the distance between the installation rail 300 and the chin support member 100 is adjusted depending on the rotation direction and degree of rotation of the turnbuckles 200 so that they can be attached to and detached from a violin.

The feature of the present invention lies in that the positions where the shoulder and the chest are supported may be adjusted according to the body of a player by freely adjusting the fixed position of the clamp 400 along the installation rail 300.

Figure 4:
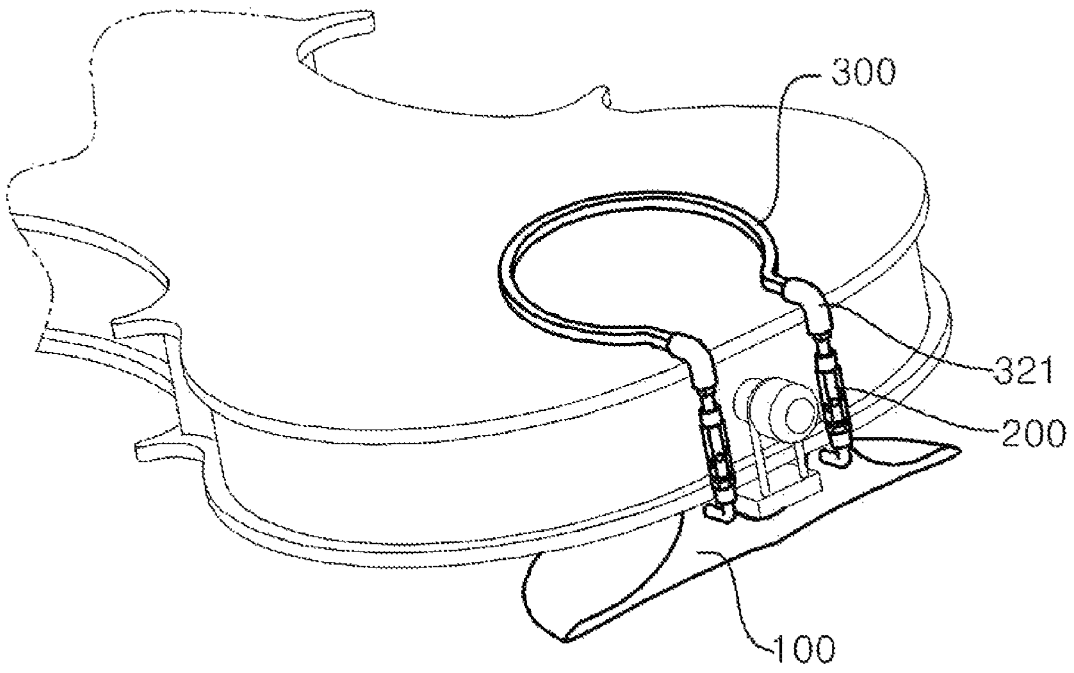
FIG. 4 is a view showing a state in which an installation rail according to the present invention is mounted on a violin.
Figure 5:
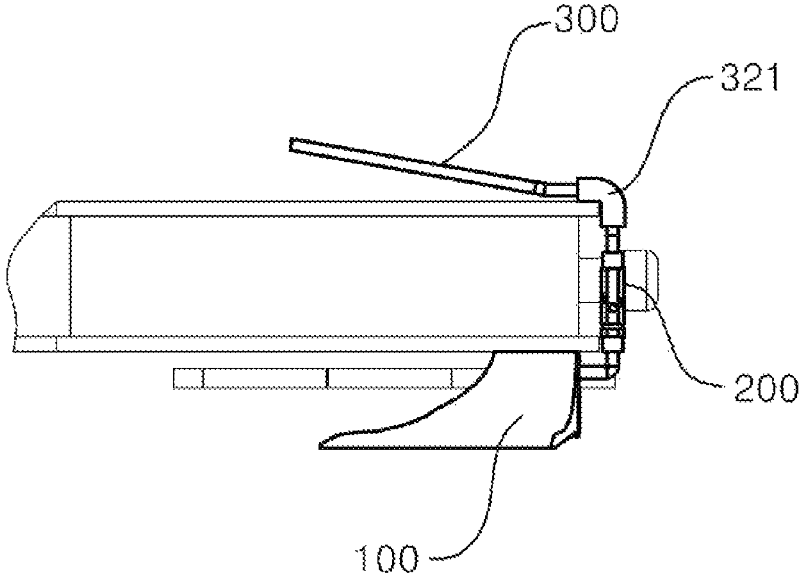
FIG. 5 is a side view of FIG. 4 of the present invention.
Figure 6:
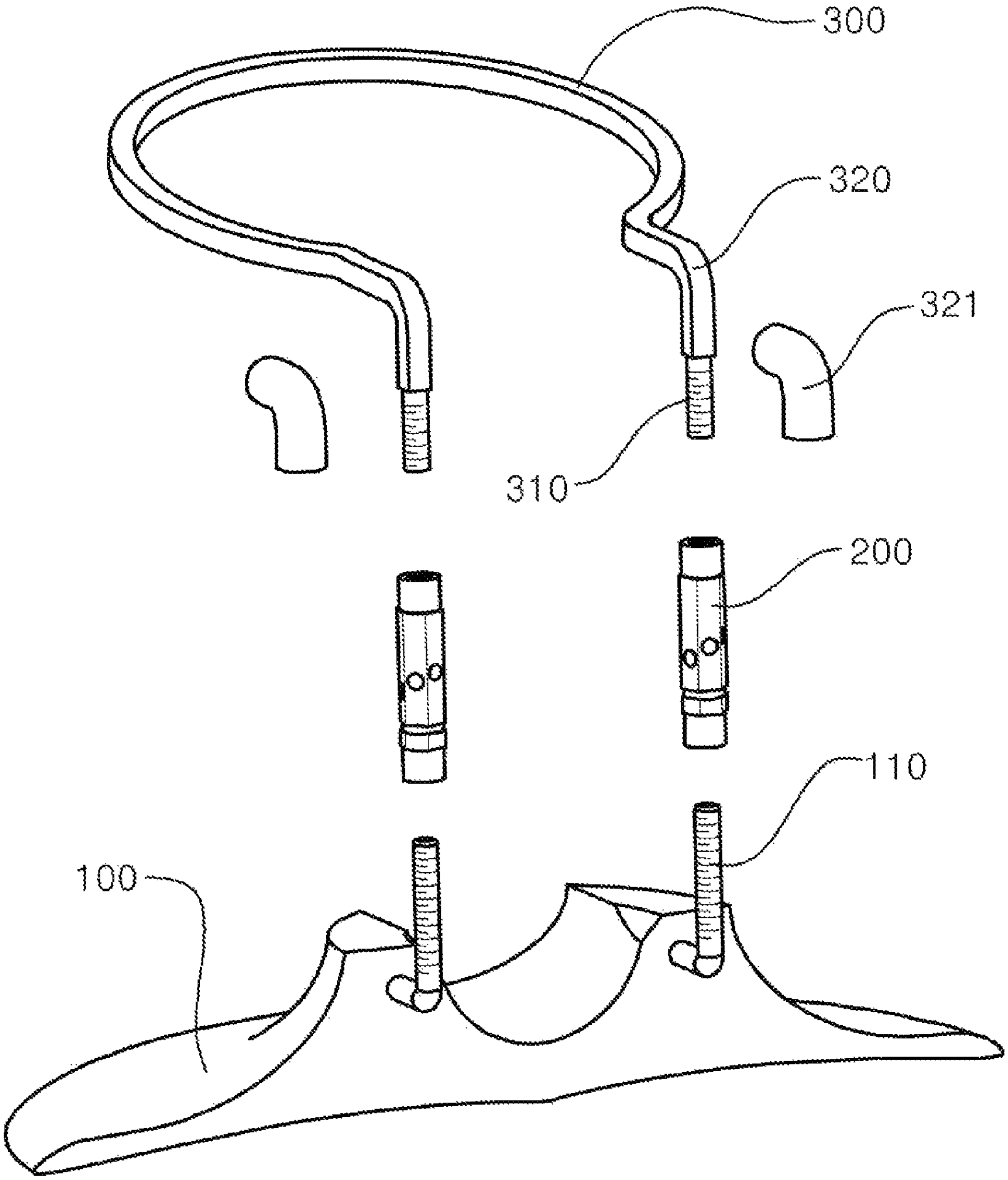
FIG. 6 is an exploded perspective view of the main components of FIG. 4 of the present invention.

As shown in FIGS. 4 to 6, the installation rail 300 of the present invention is in a form in which the pair of second coupling screw rods 310 are connected to each other. The shape of the installation rail 300 is formed to have a circular or arc-shaped path, and the installation rail 300 has a rectangular cross-section.

In addition, the installation rail 300 has bent portions 320 that are bent in an inverted reversed "L" shape over the second coupling screw rods 310 so that they can fixed to the edge of the rear surface of a violin. In this case, it is preferable that the bent portions 320 be fitted into soft tubes 321 made of urethane or silicon without directly coming into contact with the violin in order not to affect the sound quality of the violin.

Figure 7:
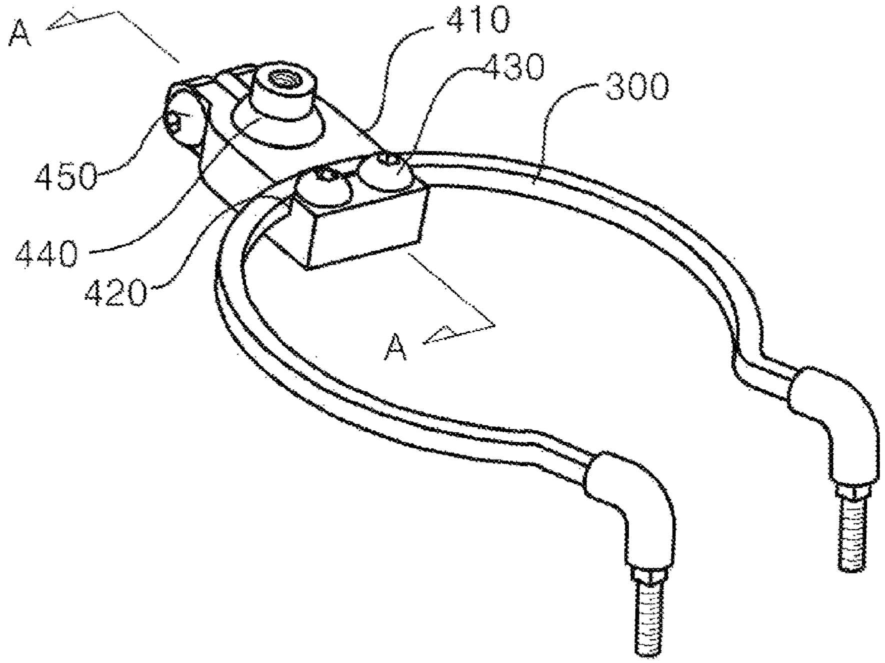
FIG. 7 is a perspective view showing the clamp of the first embodiment of the present invention.
Figure 8:
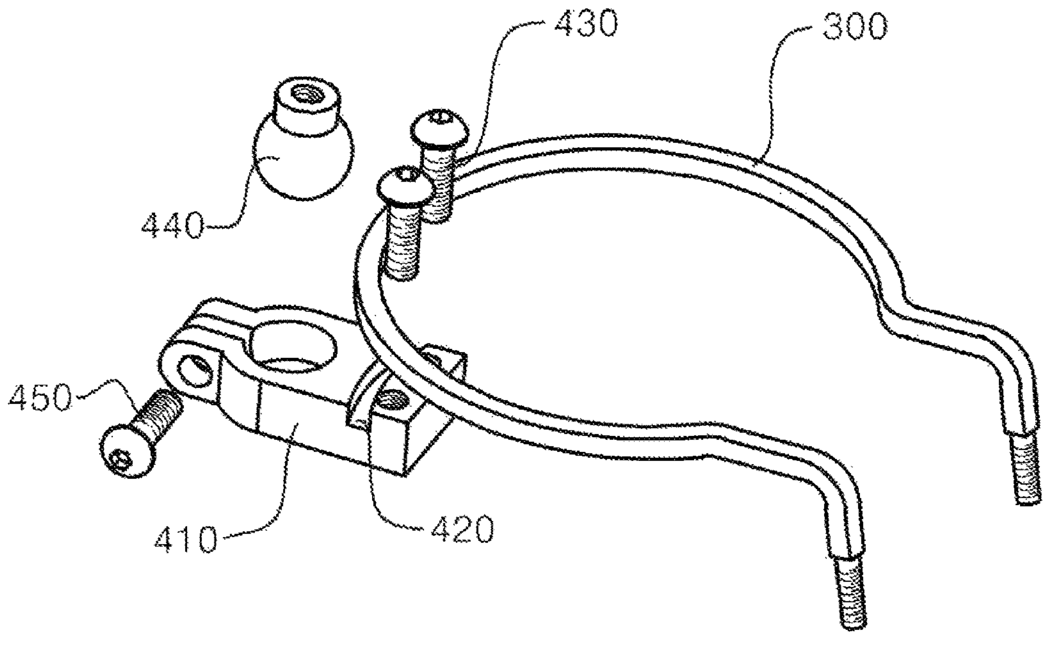
FIG. 8 is an exploded perspective view of the clamp of the present invention.

In the first embodiment of the present invention, the clamp 400 is a medium for installing the composite support member 500 to the installation rail 300. As shown in FIGS. 7 to 8, the clamp 500 includes: a body 410; a rail groove 420 formed on one side of the body 410, and configured to allow the body 410 to move along the installation rail 300; a position fixing screw 430 coupled to one side of the rail groove 420, and configured to fix the body 410 to the installation rail 300; and a ball connection part 440 ball-coupled to one side of the body 410, configured to enable an angular change in a desired direction, and coupled to the composite supporting member 500.

Figure 9:
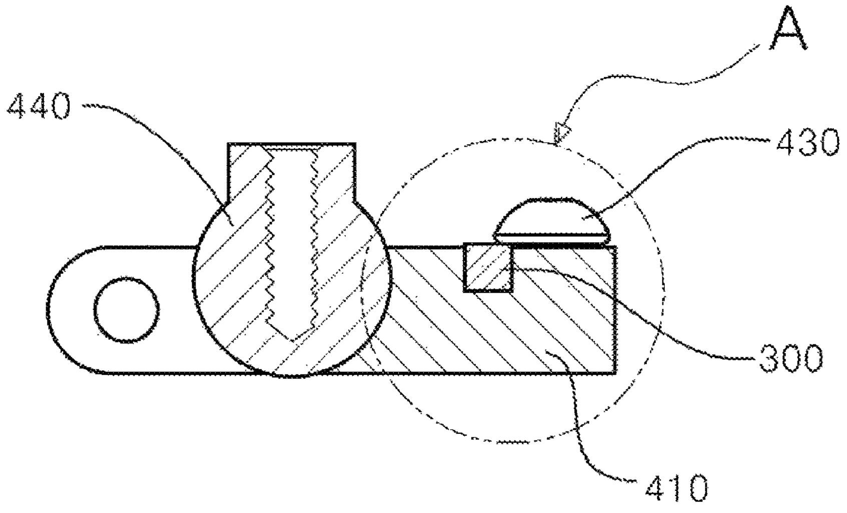
FIG. 9 is a cross-sectional view taken along line A-A in FIG. 7 of the present invention.
Figure 10:
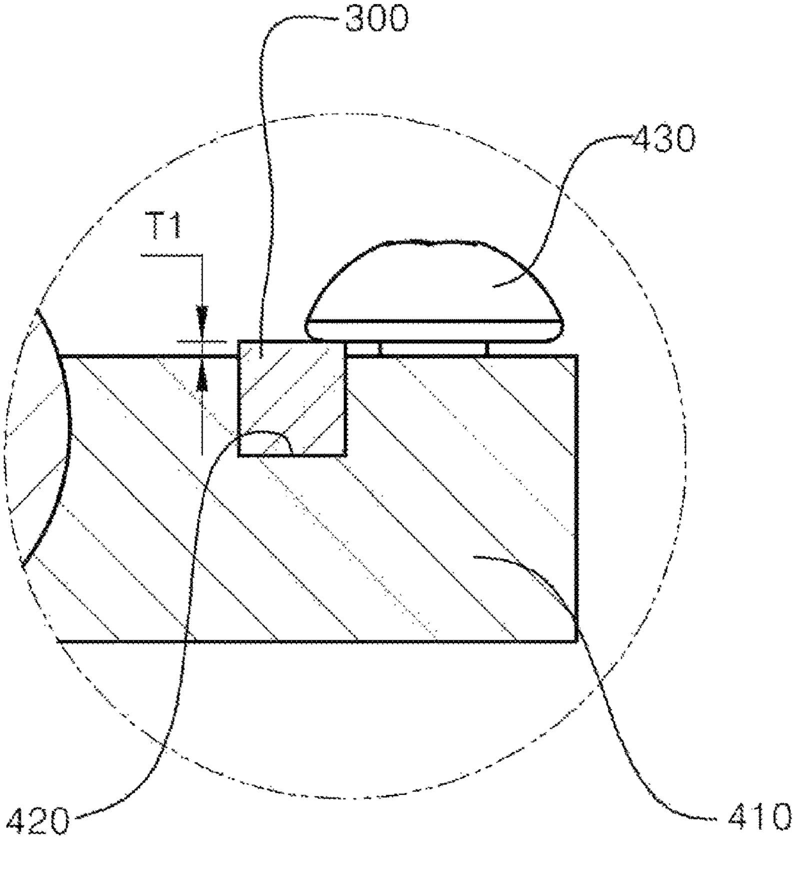
FIG. 10 is an enlarged view of part A in FIG. 9 of the present invention.

The rail groove 420 is formed on one side of the body 410, and is formed to fit the path of the installation rail 300. In addition, the rail groove 420 is also formed in a rectangular groove similar to the cross-sectional shape of the installation rail 300, and prevents the clamp 400 from rotating. Furthermore, as shown in FIGS. 9 and 10, the depth of the rail groove 420 is formed to be lower than the thickness of the installation rail 300, so that a part of the installation rail 300 is exposed out of the rail groove 420 by T1.

The position fixing screw 430 is coupled to one side of the rail groove 420 in order to come into close contact with the exposed installation rail 300, so that the position of the body 410 can be fixed. That is, in a state where the position fixing screw 430 is loosely tightened, the position of the body 410 is adjusted along the rail groove 420, and the position fixing screw 430 is tightened at the position to be fixed so that the body 410 is fixed by a strong coupling force in order not to move.

The ball connection part 440 is ball-coupled to one side of the body 410 and is rotated at a desired angle. More specifically, the ball connection part 440 is formed in the shape of a ball. The body 410 has a spherical groove to fit the shape of the ball so that the ball connection part 440 can be seated in the spherical groove and a ball fixing screw 450 configured to fix the angle of the ball connection part 440 in the form of tightening the groove is coupled to the body 410.

In addition, the ball fixing screw 450 is used to fix the angle of the ball connection 440, and may also be used to control the frictional force of the ball connection part 440 without fixing the angle so that the ball connection part 440 can be moved with appropriate pressure. That is, rather than having the angle completely fixed according to the user, the convenience of use can be increased by changing the angle little by little when a certain amount of force is transmitted. That is, depending on the user, the convenience of use may be increased by changing the angle little by little when a predetermined amount of force is transmitted, rather than having the angle completely fixed.

A female screw part is formed in the ball connection part 440, so that the ball connection part 440 can be coupled to the composite support member 500.

The first embodiment of the present invention is a technology that supports the shoulder and the chest through the single composite support member 500. That is, in the composite support member 500, configurations capable of supporting the shoulder and chest of a player are provided together.

As shown in FIG. 3, the composite support member 500 includes: a composite pad plate 510 formed in the shape of a plate; a shoulder pad 520 and a chest pad 530 attached to both ends of the composite pad plate 510, respectively; position adjustment holes 540 formed at regular intervals through the portion of the composite pad plate 510 between the shoulder pad 520 and the chest pad 530; and an adjustment screw 550 coupled to the clamp 400 at a position desired and selected from among the position adjustment holes 540 by a player.

Figure 11:
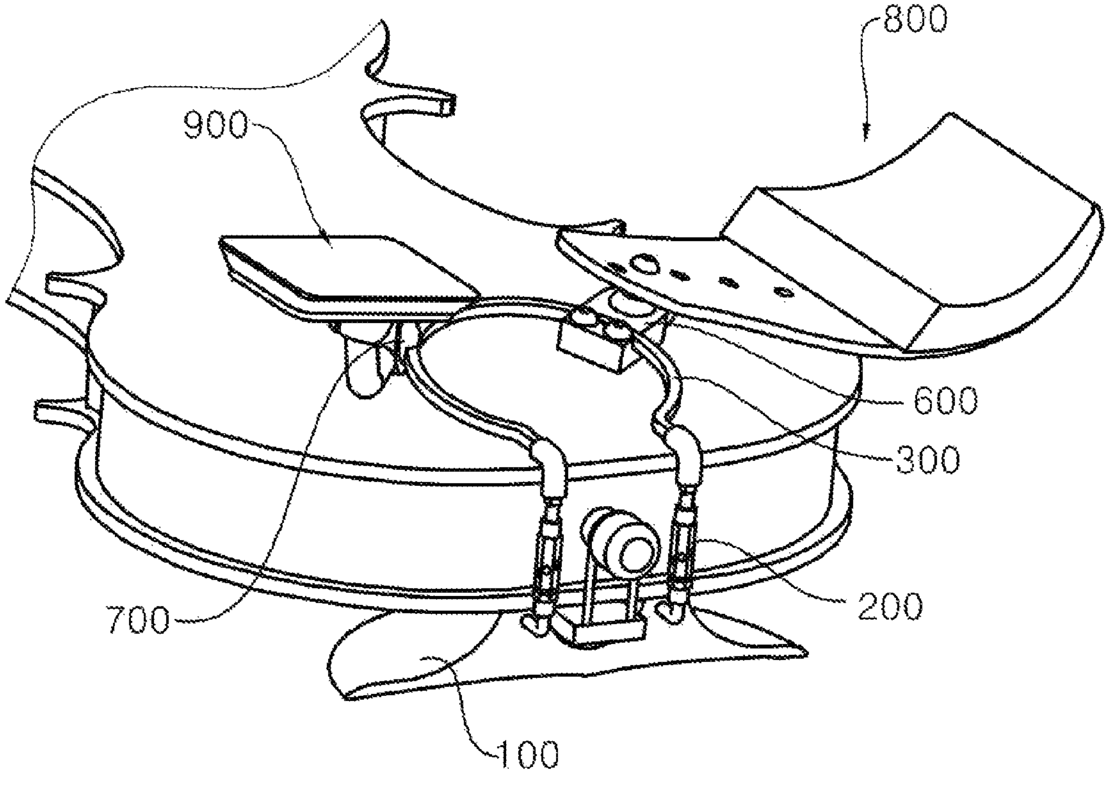
FIG. 11 is a perspective view showing the main components of a shoulder rest for a violin according to a second embodiment of the present invention.
Figure 12:
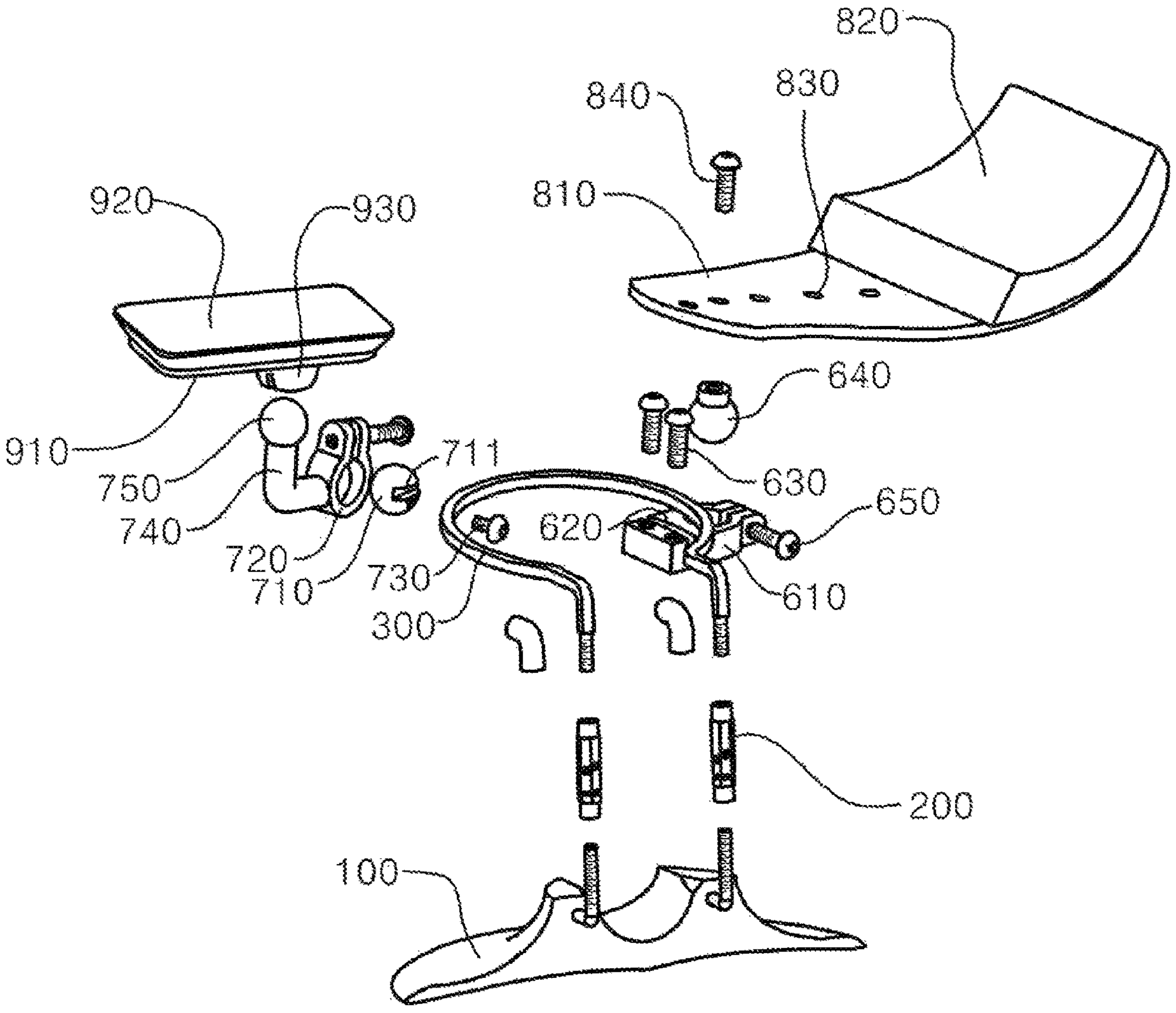
FIG. 12 is an exploded perspective view showing the main components of the second embodiment of the present invention.

FIGS. 11 and 12 show a second embodiment of the present invention. More specifically, a shoulder rest for a violin according to the second embodiment of the present invention includes: a chin rest member 100 installed in a form of being placed on the top plate of a violin, and provided with a pair of first coupling screw rods 110 formed on one side thereof; turnbuckles 200 screwed into the first coupling screw rods 110; an installation rail 300 configured such that a pair of second coupling screw rods 310 are coupled to the remaining sides of the turnbuckles 200, respectively, and the installation rail 300 is formed to connect inner ends of the second coupling screw rods 310 while forming a single path; a first clamp 400 installed at a position, desired by a player, along the path of the installation rail 300; a second clamp 700 additionally installed onto the installation rail 300, and configured to be adjusted and fixed to a position, desired by the player, together with the first clamp 600; a shoulder support member 500 coupled to the 600, and configured to support the player's shoulder; and a chest support member 900 coupled to the second clamp 700, and configured to support the player's chest.

The second embodiment includes the first clamp 600 and the second clamp 700, and has a structure in which the shoulder support member 800 and the chest support member 900 are coupled to the respective clamps.

The structures of the chin support member 100 and installation rail 300 of the second embodiment are the same as those of the first embodiment, so that redundant descriptions thereof will be omitted.

The first clamp 600 includes: a body 610; a rail groove 620 formed on one side of the body 610, and configured to allow the body 610 to move along the installation rail 300; a position fixing screw 630 coupled to one side of the rail groove 620, and configured to fix the body 610 to the installation rail 300; and a ball connection part 640 ball-coupled to one side of the body 610, configured to enable an angular change in a desired direction, and coupled to the shoulder support member 800.

The first clamp 600 is configured to have the same coupling structure as the clamp 400 of the first embodiment, and the ball fixing screw 650 is coupled to the body 610 of the first clamp 600 as in the first embodiment.

Figure 13:
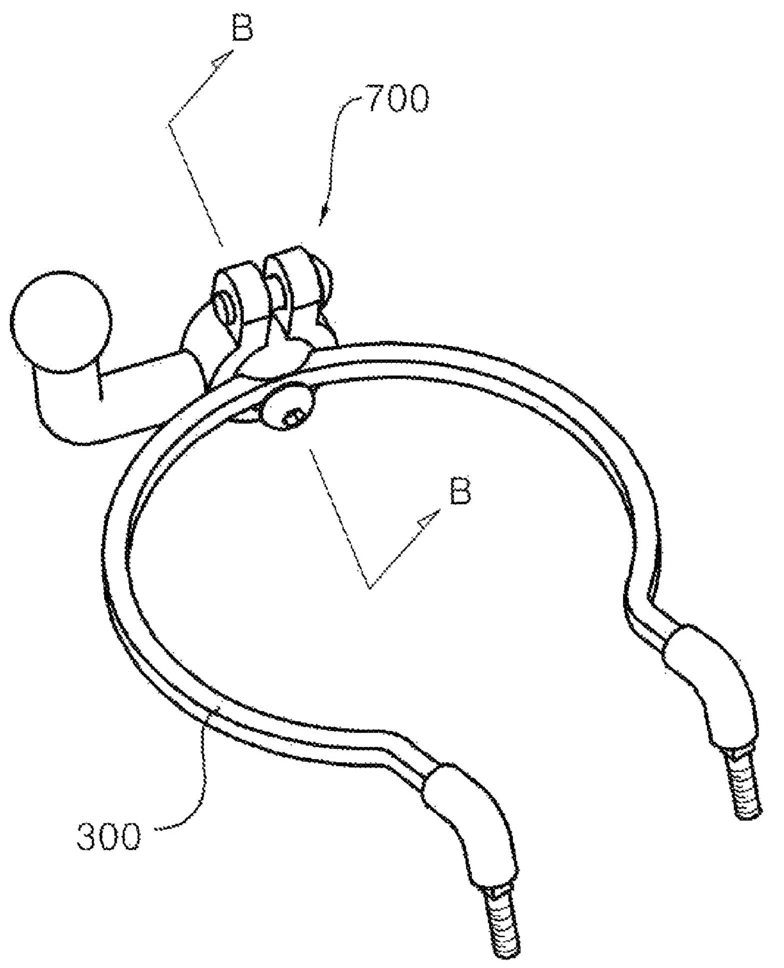
FIG. 13 is a perspective view showing a second clamp applied to the second embodiment of the present invention.
Figure 14:
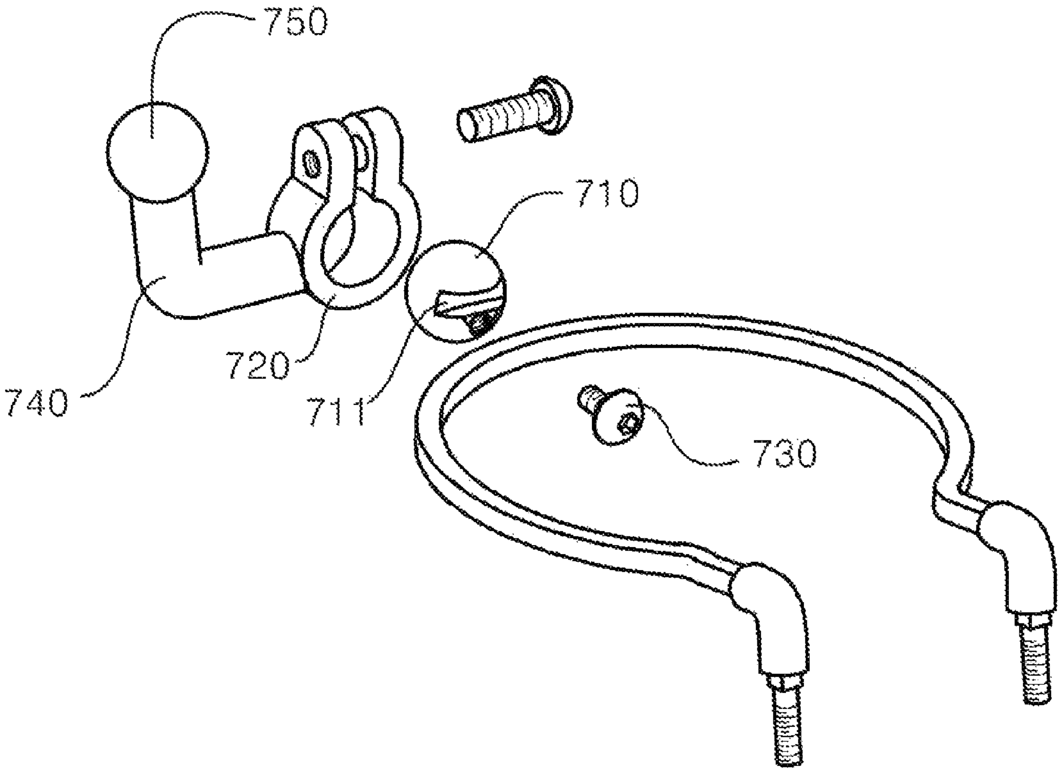
FIG. 14 is an exploded perspective view of the second clamp of the present invention.

The second clamp 700 is a component applied only to the second embodiment. As shown in FIGS. 13 and 14, the second clamp 700 includes: a movable ball 710 formed in a ball shape, and provided with a movable groove 711 formed to be movable along the installation rail 300; a ball housing 720 ball-coupled with the movable ball 710, and configured to make a change to a desired angle; a ball position fixing screw 730 coupled to the movable ball 710, and configured to fix the movable ball 710 and the ball housing 720 to the installation rail 300; and a connection rod 740 formed to protrude from one side of the ball housing 720; and a ball-shaped portion 750 integrated with an end of the connection rod 740, and coupled to the chest support member 900.

Figure 15:
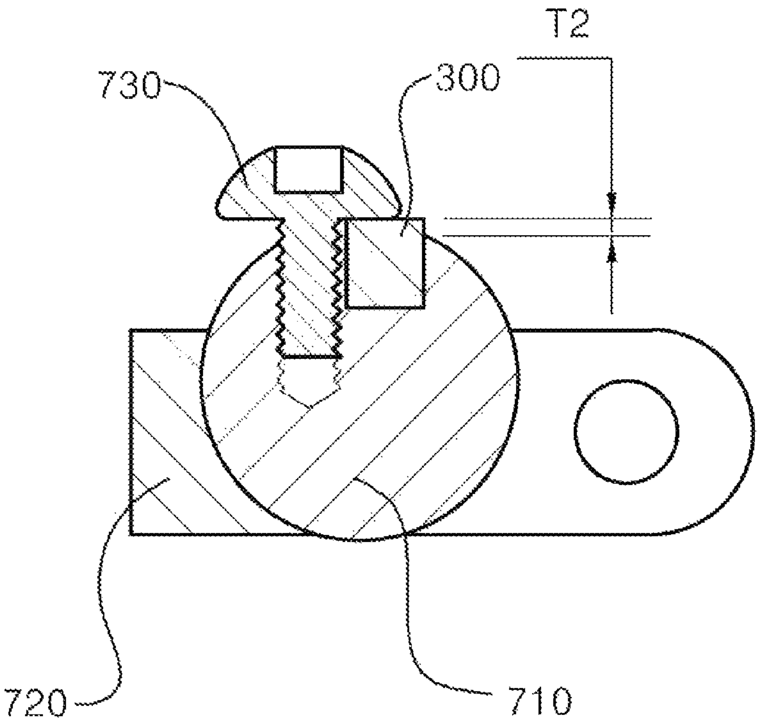
FIG. 15 is a cross-sectional view taken along line B-B in FIG. 13 of the present invention.

The moving groove 711 formed in the movable ball 710 is formed as a rectangular groove like the rail groove 620. The depth of the movable groove 711 is formed to be lower than the thickness of the installation rail 300 so that a part of the installation rail 300 is exposed out of the movable groove 711 by T2, as shown in FIG. 15. Furthermore, the ball position fixing screw 730 is coupled to the movable ball 710 and applies a strong coupling force to the exposed installation rail 300, thereby fixing the position of the ball housing 720.

In addition, the ball housing 720 has a spherical groove formed such that the movable ball 710 is ball-coupled thereto, and has a structure in which the movable ball 710 can be fixed or a frictional force can be adjusted in the form of adjusting the coupled screw, as in the first clamp 600.

The connection rod 740 is formed on one side of the ball housing 720, and a ball-shaped portion 750 having a larger thickness than the connection rod 740 is integrated with an end of the connection rod 740.

In the second embodiment of the present invention, the shoulder support member 800 and the chest support member 900 are independently coupled. The shoulder support member 800 includes: a shoulder pad plate 810 formed in the shape of a plate; a shoulder pad 820 attached to one side of the shoulder pad plate 810; a plurality of position adjustment holes 830 formed through the shoulder pad plate 810 at regular intervals; and an adjustment screw 840 coupled to the first clamp 600 at a position desired and selected from among the position adjustment holes 830 by the player.

The adjustment screw 840 is coupled to the ball connection part 640 of the first clamp 600, and is screwed into a female screw part formed in the ball connection part 640.

In addition, the chest support member 900 includes: a chest pad plate 910 formed in the shape of a plate; a chest pad 920 attached to the overall surface of one side of the chest pad plate 910; and a ball coupling portion 930 formed on the side of the chest pad plate 910 opposite to the chest pad 920, ball-coupled with the ball-shaped portion 750, and configured to adjust the chest pad 920 in a desired direction.

Figure 16:
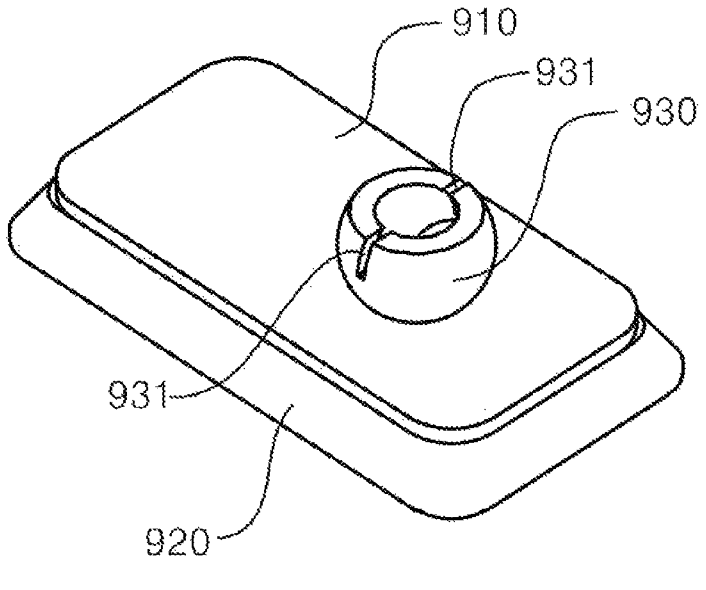
FIG. 16 is a perspective view showing the rear surface of a chest support member applied to the second embodiment of the present invention.

As shown in FIG. 16, in the ball coupling portion 930, multiple cutouts 931 are formed partially through the outer circumferential surface of the ball coupling portion 930 so that the ball portion of the ball-shaped portion 750 can be fitted into the ball coupling portion 930 by using the elasticity of the ball coupling portion 930 itself.

The present invention allows the shoulder rest to be applied to existing turnbuckles, conventionally used, without requiring any additional device, thereby providing the effect of increasing the convenience of fabrication, and also allows the shoulder rest to be fixed to a violin in integration with a chin rest, thereby providing the effect of minimizing a contact area with the violin and thus improving sound quality compared to the prior art.

In addition, the present invention enables primary position adjustment through the installation rail and the clamp, enables secondary angle adjustment through the ball coupling structure of the clamp itself, and also enables tertiary location adjustment through the adjustment of the position where the composite pad plate provided with the pad is coupled, thereby increasing the range of position adjustment compared to the prior art and finely adjusting a support position to one of various positions according to the body shape of a user so that a violin can be seated at an optimal position.

Although the present invention has been described with reference to the above embodiments above, various modified implementations may be possible within the scope of the technical spirit of the present invention.

What is claimed is:

1. A shoulder rest for a violin, the shoulder rest comprising:
- a chin rest member installed in a form of being placed on a top plate of a violin, and provided with a pair of first coupling screw rods formed on one side thereof;
- turnbuckles screwed into the first coupling screw rods;
- an installation rail configured such that a pair of second coupling screw rods are coupled to remaining sides of the turnbuckles, respectively, and the installation rail is formed to connect inner ends of the second coupling screw rods while forming a single path;
- a clamp installed at a position, desired by a player, along a path of the installation rail; and
- a composite support member coupled to the clamp, and configured to support a shoulder and chest of the player.

2. The shoulder rest of claim 1, wherein the installation rail forms a circular path and has a rectangular cross-sectional structure.

3. The shoulder rest of claim 1, wherein the clamp comprises:
- a body;
- a rail groove formed on one side of the body, and configured to allow the body to move along the installation rail;
- a position fixing screw coupled to one side of the rail groove, and configured to fix the body to the installation rail; and
- a ball connection part coupled to one side of the body, configured to enable an angular change in a desired direction, and coupled to the composite supporting member.

4. The shoulder rest of claim 1, wherein the composite support member comprises:
- a composite pad plate formed in a plate shape;
- a shoulder pad and a chest pad attached to both ends of the composite pad plate, respectively;
- position adjustment holes formed at regular intervals through the portion of the composite pad plate between the shoulder pad and the chest pad; and
- an adjustment screw coupled to the clamp at a position desired and selected from among the position adjustment holes by the player.

5. A shoulder rest for a violin, the shoulder rest comprising:
- a chin rest member installed in a form of being placed on a top plate of a violin, and provided with a pair of first coupling screw rods formed on one side thereof;
- turnbuckles screwed into the first coupling screw rods;
- an installation rail configured such that a pair of second coupling screw rods are coupled to remaining sides of the turnbuckles, respectively, and the installation rail is formed to connect inner ends of the second coupling screw rods while forming a single path;
- a first clamp installed at a position, desired by a player, along a path of the installation rail;
- a second clamp additionally installed onto the installation rail, and configured to be adjusted and fixed to a position, desired by the player, together with the first clamp;

a shoulder support member coupled to the first clamp, and configured to support a shoulder of the player; and a chest support member coupled to the second clamp, and configured to support a chest of the player.

6. The shoulder rest of claim 5, wherein the first clamp comprises:

a body;

a rail groove formed on one side of the body, and configured to allow the body to move along the installation rail;

a position fixing screw coupled to one side of the rail groove, and configured to fix the body to the installation rail; and a ball connection part ball-coupled to one side of the body, configured to enable an angular change in a desired direction, and coupled to the shoulder support member.

7. The shoulder rest of claim 5, wherein the second clamp comprises:

a movable ball formed in a ball shape, and provided with a movable groove formed to be movable along the installation rail;

a ball housing ball-coupled with the movable ball, and configured to make a change to a desired angle;

a ball position fixing screw coupled to the movable ball, and configured to fix the movable ball and the ball housing to the installation rail; and a connection rod formed to protrude from one side of the ball housing; and a ball-shaped portion integrated with an end of the connection rod, and coupled to the chest support member.

8. The shoulder rest of claim 5, wherein the shoulder support member comprises:

a shoulder pad plate formed in a plate shape;

a shoulder pad attached to one side of the shoulder pad plate;

a plurality of position adjustment holes formed through the shoulder pad plate at regular intervals; and an adjustment screw coupled to the first clamp at a position desired and selected from among the position adjustment holes by the player.

9. The shoulder rest of claim 7, wherein the chest support member comprises:

a chest pad plate formed in a plate shape;

a chest pad attached to an overall surface of one side of the chest pad plate; and a ball coupling portion formed on a side of the chest pad plate opposite to the chest pad, ball-coupled with the ball-shaped portion, and configured to adjust the chest pad in a desired direction.

* * * * *